United States Patent [19]

Walczak et al.

[11] Patent Number: 5,603,245
[45] Date of Patent: Feb. 18, 1997

[54] METHOD FOR A TRANSLATORY MOTION OF COMPONENTS

[75] Inventors: Bruno Walczak, Aachen, Germany; Johann Mostert, Eupen, Belgium

[73] Assignee: Schumag Aktiengesellschaft, Aachen, Germany

[21] Appl. No.: 560,198

[22] Filed: Nov. 21, 1995

Related U.S. Application Data

[62] Division of Ser. No. 189,886, Feb. 1, 1994, abandoned.

[30] Foreign Application Priority Data

Feb. 2, 1993 [DE] Germany ............................ 43 02 788.1

[51] Int. Cl.[6] ............................ F16H 25/12; F16H 53/00
[52] U.S. Cl. ............................ 74/569; 74/56; 74/58; 74/567; 123/90.5; 29/888.1
[58] Field of Search ............................ 74/567–569, 56, 74/58; 123/58 A, 58 AB, 58 R, 90.48, 90.5; 29/888.1

[56] References Cited

U.S. PATENT DOCUMENTS

| | | |
|---|---|---|
| 1,000,722 | 8/1911 | Danver . |
| 1,339,276 | 5/1920 | Murphy . |
| 2,027,076 | 1/1936 | Volliman . |
| 2,243,819 | 5/1941 | Herrmann . |
| 2,966,899 | 1/1961 | Herrmann . |
| 2,969,692 | 1/1961 | Pfarrwaller . |
| 3,374,684 | 3/1968 | Greven . |
| 3,456,630 | 7/1969 | Karlan . |
| 4,090,478 | 5/1978 | Trimble et al. . |
| 4,248,104 | 2/1981 | Wood ............................ 74/569 |
| 4,301,696 | 11/1981 | Andersson ............................ 74/569 X |
| 4,432,310 | 2/1984 | Waller . |
| 4,726,253 | 2/1988 | Russell ............................ 74/569 |
| 5,040,426 | 8/1991 | Wueller . |
| 5,099,805 | 3/1992 | Ingalls ............................ 123/90.15 |
| 5,231,960 | 8/1993 | White ............................ 123/90.16 |
| 5,488,769 | 2/1996 | Natwick et al. ............................ 29/888 |

FOREIGN PATENT DOCUMENTS

| | | |
|---|---|---|
| 0112805 | 7/1984 | European Pat. Off. . |
| 550841 | 3/1923 | France . |
| 1286129 | 1/1962 | France . |
| 1028067 | 4/1958 | Germany . |
| 2322279 | 5/1974 | Germany . |
| 2194610 | 3/1988 | United Kingdom . |

Primary Examiner—Vinh T. Luong
Attorney, Agent, or Firm—W. G. Fasse; W. F. Fasse

[57] ABSTRACT

A structural component (21) is moved axially back and forth with the aid of a closed cam (40A) arranged on a rotating cam carrier (33) for mechanically entraining cam follower rollers carried by the structural component. At least one roller (26) of a pair of rollers contacts one cam surface of said closed cam with a controlled contact force. For this purpose the contact force between the cam follower rollers and the respective cam surface is varied during one cam revolution in such a way that in an angular range (41) of the reversing point (O.T., U.T.) the contact force of at least one cam follower roller that transmits the motion in the respective direction, is increased to such an extent that this force corresponds at least to the inertia force resulting from the brake application or acceleration of the component to be moved. Outside of the angular range (41) the cam follower rollers (26, 27) are kept in contact with the cam surfaces with a minimal force.

6 Claims, 3 Drawing Sheets

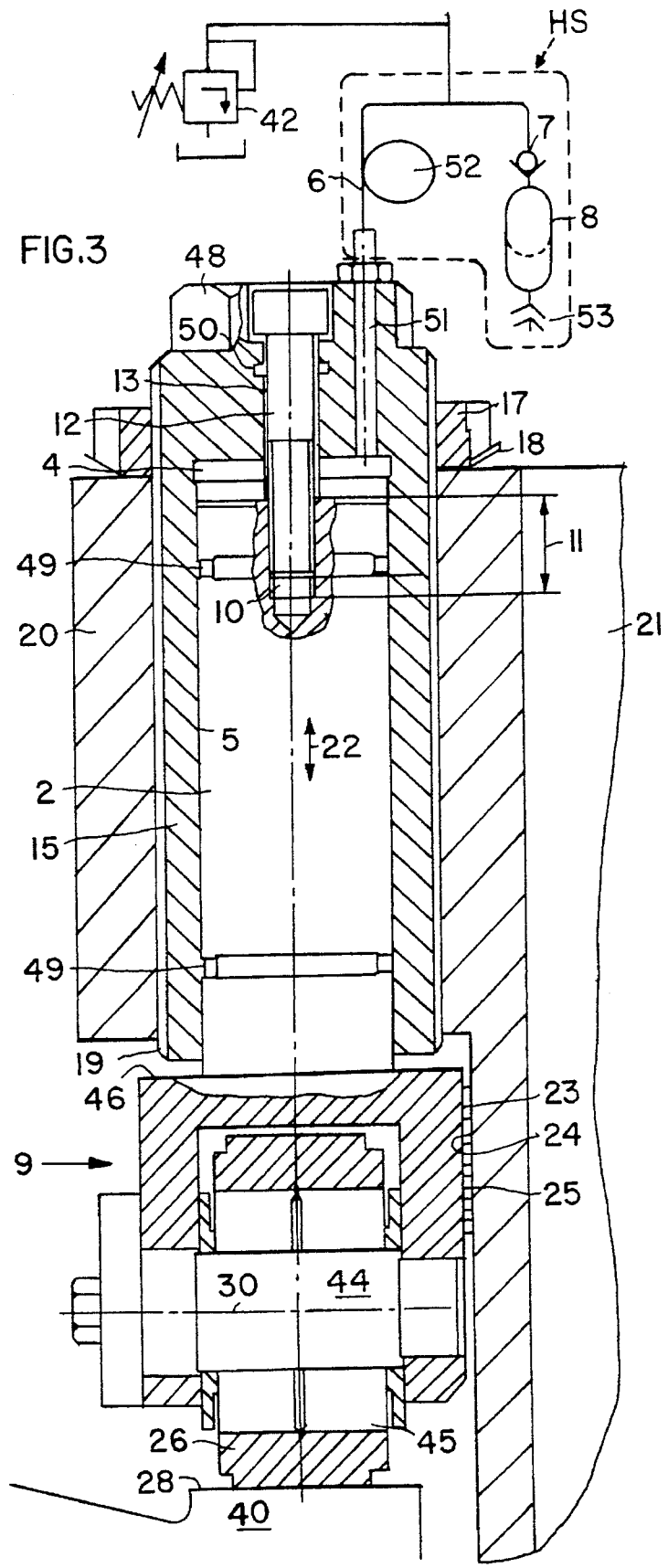

METHOD FOR A TRANSLATORY MOTION OF COMPONENTS

CROSS-REFERENCE TO RELATED APPLICATION

This application is a Divisional Application of U.S. Ser. No. 08/189,886, filed Feb. 1, 1994, now abandoned.

FIELD OF THE INVENTION

The invention relates to a method for the translatory moving of structural components with the aid of a closed mechanical entrainment of the structural components by the cam for moving back and forth in a working direction and in a return stroke direction.

BACKGROUND INFORMATION

Structural components such as drawing slides in a straight drawing machine comprise entraining elements which are preferably roller or cylinder elements cooperating with the drive cam for entrainment. At least one of the roller or cylinder elements bears movably against a cam surface under a force applied to the at least one roller or cylinder element.

European Patent Application No. 88,119,950, published under U.S. Pat. No. 0,371,165 discloses a method and a respective motion drive as described above. This reference also describes other known motion drives of the type here involved. European Patent Application 88,119,950 corresponds to U.S. Pat. No. 5,040,426 (Wueller).

According to said European Publication or U.S. Pat. No. 5,040,426, one of the respective rollers that is intended for contacting the entraining cam is subject to play outside the direction reversing zone O.T., and thus does not contact the entraining cam. Such a play is frequently not permissible or at least undesirable so that in such instances use must be made of the undesirable features of the prior art as described in the above mentioned European Publication or U.S. Patent.

OBJECTS OF THE INVENTION

It is an object of the invention to suggest a method which avoids the mentioned play when the method is performed or which is constructed to avoid such play. Further, the present method shall make it possible to realize the known advantages of a small wear and tear and to satisfy low tolerance requirements for a cam drive that permits practicing the invention. The advantages of a low structural effort and expense and of a simple assembly shall also be maintained when practicing this method.

SUMMARY OF THE INVENTION

Starting with a method of the type described above, the above objects have been achieved by the present method in that the contact force exerted by the entraining elements during one cam revolution is varied so that in the zone of the return point the contact force of at least one entraining element that transmits the respective motion direction, is increased to such an extent that the increased contact force corresponds at least to the inertia force of the component to be moved which inertia force is caused by a braking action and/or an acceleration, whereupon outside of the zone or limited angular range in which the direction reversing points are located, the entraining elements are maintained in contact with the cam surfaces with a minimal force. Such a method in which the contact force between the entraining elements and the cam surfaces of the drive cam are varied, makes it possible to maintain a relative weak contact force in the zone of a constant motion of the structural components to be moved and it also makes it possible to impose a very high contact force in the zone of the acceleration or deceleration of the components to be moved so that the resulting forces can be taken up safely. Simultaneously, the contact of the entraining elements by the drive cam with a variable force permits relatively large cam thickness tolerances and other cam imprecisions, because it is easy to yield to these large cam thickness tolerances and other cam imprecisions. Due to the possibility of variable forces, the respective entraining elements constantly contact the cam that serves for the entraining so that the heretofore required play between the mentioned elements and the cam in certain phases of a full revolution of the cam, can be avoided.

For performing the present method one by uses a motion drive comprising at least one closed or endless 360° drive cam arranged on a cam carrier that is rotatable for the mechanical entraining by the cam, of structural components to be moved back and forth. The structural components are entrained by entraining elements contacting cam surfaces. The entraining elements are preferably rollers or cylinders cooperating with the drive cam. At least one of the rollers or cams is caused to contact the cam surface by a force. It is suggested for such a motion drive that the roller or cylinder element effective in the working direction contacts the cam surface rigidly while the opposite roller or cylinder element movably contacts the cam surface during the entire revolution of the cam carrier in such a manner that the contact force is increased when the spacing or cam thickness between the roller or cylinder element and the cam surface increases and that the contact force is reduced when said spacing or cam thickness is reduced. Further, the cam cross-section varies at least in the zone of the reversing point where the return stroke begins. The cam cross-section varies toward the reversing point in such a way that a minimal spacing filled by the cam cross-section between the rollers or cylinders increases toward the reversing point. The cam cross-section away from the reversing or return point is reduced again to a minimal spacing. The increase toward the reversing point and the decrease away from the reversing point is such that the forces that vary due to the imposed spacing variation, correspond in the zone or angular range wherein the reversing point is located, in their size at least to the inertia forces that occur due to the acceleration or deceleration of the component to be moved. During the uniform return stroke these forces correspond to the occurring return stroke force caused by the reduction in said cross-section. Thus, both roller or cylinder elements contact the cam surface with a force that enables one of these rollers or cylinders to be movable under this force. This force shall also be varied by varying the spacing between said two roller or cylinder elements. It is clear that the force is a spring force and that the spring force is produced by a spring having a certain spring characteristic. Hereby, it is irrelevant whether the spring is a mechanical spring or a hydraulic spring. The respective roller or cylinder element bears rigidly against the respective cam in the direction of the draw stroke which requires large forces so that no yielding motion is possible whatsoever. The opposite roller or cylinder is movable under the spring force, whereby the force effective on the cam varies with the stroke or with the displacement of such a motion. This feature makes it possible to construct the cross-section of the cam in the zones in which no large acceleration or deceleration forces must be taken up, in such a way that said rollers or cylinder elements are positioned close to each other so that the respective roller or cylinder imposes only a very small contact force. Manufacturing tolerances in the cam are easily tolerated because the small yielding motions of said rollers and cylinders caused by these tolerances involve only small force variations so that no overloads occur. Rollers and cylinders are preferred as entraining elements for contacting the cam. In zones in which larger forces must be applied, such larger force application may be simply accomplished by making the cam thicker so that the spacing between the entraining elements, for example, constructed as roller cylinders, is increased, whereby the contact force increases in accordance with the rise of the spring characteristic. This rise of the spring characteristic can be formed as desired, by the size of the cam thickness and by selection of the spring characteristic. Preferably, care should be taken to provide a suitable increase of the cam cross-section thickness in order to avoid shocks and abrupt transitions.

The spring force is controlled by a; cam cross-section or cam thickness that changes in the angular range or zone wherein the reversing point (O.T.) is located in such a way that the largest spacing between the rollers or cylinder elements is achieved before the points of contacts thereof with the cam surface reach the reversing point (O.T.). This feature makes sure that at least in the reversing point where the motion direction is switched from the draw direction into the return stroke direction the required force necessary for the acceleration or deceleration is achieved. Here attention is also to be paid to the fact that one such thickening of the cam cross-section for increasing the spacing of said roller or cylinder elements is required only in the zone of the upper dead point where the switching from the pulling stroke to the return stroke is started if the roller or cylinder transmitting the pulling force is rigidly mounted. In such a case, a thickening of the cam at the lower reversing point is not necessary because the forces occurring at this point are taken up by the rigidly arranged roller or cylinder element in any event. The roller or cylinder element contacting the cam in this area, can bear against the cam with a small spring force. However, in the area of the other reversing point in which a reversing stroke is imposed and thus a motion direction reversed, the force applied to the roller or cylinder elements must be increased so that the roller or cylinder elements are able to stop the motion in the working direction, to reverse the motion, and to apply a corresponding acceleration in the return stroke direction. When the return stroke speed has been reached, the contact force can again be reduced down to a minimal force sufficient for performing the return stroke. This reduction of the contact force can be accomplished by reducing the cam cross-section and thus by reducing the spacing of the rollers or cylinders arranged opposite each other and bearing against the cam surface. This minimal force can be maintained also in the area of the lower reversing point which begins the motion in the working direction. The forces occurring in this lower reversing point are safely taken up by the rigid roller or cylinder bearing against the drive cam.

Further, it is suggested according to the invention that at least at the upper reversing point (O.T.) the limited angular reversing range covers up to 100°. In this limited angular range the required change in the spacing between said roller or cylinder elements for the necessary force increase, is caused by a respective change in the cam width or thickness. Then, the force increase is reduced again as much as possible. A complete reversing for the return stroke is not possible, because the roller or cylinder element which transmits the return stroke motion must transmit a larger force with a constant velocity during the return stroke than during the working stroke. In the lower reversing point, where the roller or cylinder element that transmits the motion in the working direction bears against the cam with the force necessary for performing the working stroke, it is possible to reduce the contact force of the other roller or cylinder by a corresponding reduction of the cam cross-section present between the roller or cylinder elements, to a minimum for maintaining a safe contact with the cam. The mentioned range of 100° at the upper reversing point makes sure that random spacing variations and thus random force changes and shocks are avoided. It is advantageous if the largest spacing between the rollers or cylinders that are arranged opposite each other and which transmit the respective motion and contact the cam, is reached prior to reaching the dead point (reversing point) so that even prior to reaching the upper dead point the largest contact force is achieved. After, following passage of the upper reversing point, the return stroke motion has been started and the required acceleration forces have been applied, said spacing and thus the respective contact force can again be continuously reduced to such an extent that the remaining contact force is sufficient to pass through the remaining return stroke distance with a constant velocity.

The invention further suggests that at least the upper reversing point (O.T.) is positioned in the center of the reversing range. This feature simplifies the manufacture, but is by no means necessary. Dynamic conditions prevailing in any particular embodiment may cause another position to appear to be more advantageous.

For practicing the invention it is further suggested that in the direction of motion of the structural component to be moved, two entraining elements are arranged one behind the other or in series on this structural component. The cam surfaces are positioned between these two entraining elements. The position of the entraining elements in series simplifies their construction and mounting. Even the size of the structure can be reduced thereby. The arrangement simultaneously makes sure that a cam track can be used that is raised on a cam carrier. The flanks of the raised cam track are easily machined.

The invention further provides that the entraining elements are arranged on a draw slide of a straight draw machine, the working direction of which is in the direction of the draw stroke. This is the typical case of use of the invention.

BRIEF DESCRIPTION OF THE DRAWINGS

The invention will now be described by way of example in more detail with reference to the accompanying drawings, wherein:

FIG. 3 shows a longitudinal section through an entraining element biased by a hydraulic spring, whereby the section plane is the same as in FIG. 2.

DETAILED DESCRIPTION OF PREFERRED EXAMPLE EMBODIMENTS AND OF THE BEST MODE OF THE INVENTION

Figure 1:
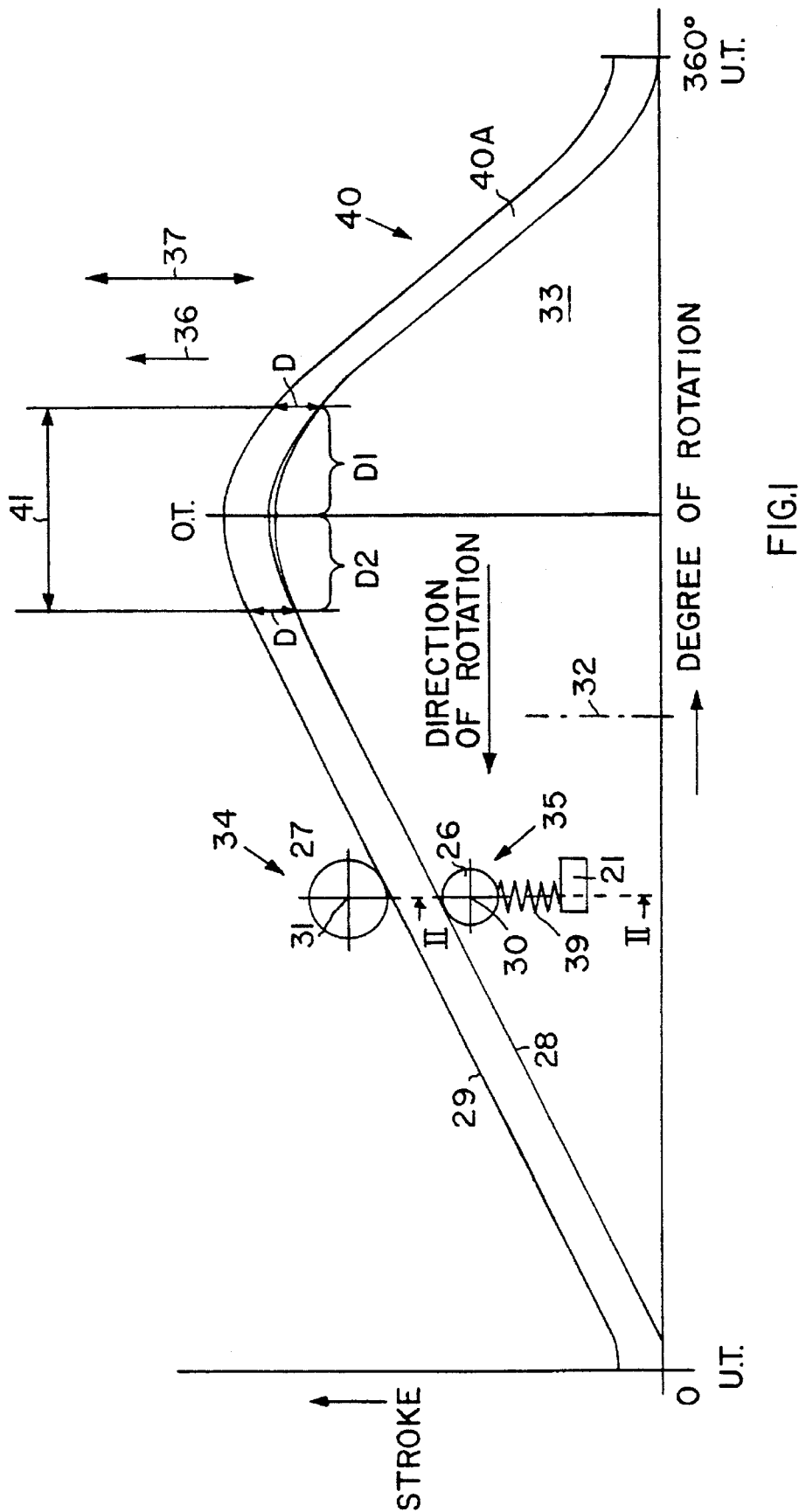
FIG. 1 shows a projection of a cam on the also projected cam carrier over one 360° revolution of the cam drive.

A rotatably mounted cylinder or drum 40 is used as a cam carrier on which a cam track 40A is arranged, for example, as a raised rail 40A which is shown in its projection in FIG. 1. Such a cylinder or drum 40 is used as a motion drive, for example, in a draw slide of a straight drawing machine or also for the two draw slides typically arranged in such machines. These draw slides transfer the material being drawn between each other. One such cam track 40A arranged on a cam carrier 33 is provided for each slide to be driven. Such a cam comprises as far as it is raised, the cam surfaces 28 and 29 positioned opposite to each other and contacted by cam follower rollers 26, 27 respectively, after. According to the invention the cam thickness D is increased along a portion D1 within a limited angular range 41 next to at least one of the reversing points O.T. or U.T., preferably at the upper reversing point O.T. as shown in FIG. 1. The cam thickness D is reduced again in portion D2 also in the range 41. This increase and decrease in the cam thickness controls; a spring force as described in more detail below. Two entraining elements 34 and 35 are arranged on and secured to each structural component 21 to be moved by the cooperation of the entraining elements with the cam 40. Each component 21 is, for example, a draw slide. These entraining elements 34 and 35 are arranged opposite each other and one behind the other as viewed in the motion direction 37 of the component 21 to be moved. FIG. 1 shows these entraining elements 34 and 35 in a position cooperating with the cam track 40A. If one considers in FIG. 1 the shown arrow for the direction of rotation and if one assumes that the cam carrier 33 rotates in the direction of this arrow, the entraining elements 34 and 35 perform a back and forth motion or stroke indicated by the arrow 37 relative to the cam track 40A which rotates from 0° to 360° for each stroke 37. Each stroke enforces a motion of the component 21 in the motion or stroke direction 37. This type of motion generation, however, is known as such so that it is not necessary to further describe it.

In order that the described motion of the component 21 to be moved, for example of a draw slide of a straight drawing machine, can be produced, by the cam track 40A, each of the entraining elements 34 and 35 comprises at least one roller 26 and 27 respectively. In this example embodiment the roller 27 shall be the roller for transmitting a force larger than the force to be transmitted by the roller 26. This situation occurs for example for the drawing stroke of the draw slide in a straight drawing machine, wherein the roller 27 transmits the drawing stroke and the roller 26 transmits the required force for the slide return stroke. The roller 27 is preferably mounted rigidly to the component 21, but rotatable relative to the component 21. The roller 26 may be somewhat less sturdy and smaller and is constructed for adjustment in the motion direction of the stroke 37. For this purpose the roller 26 is rotatably mounted in a fork type roller head 9 on a roller shaft 44 and rotatable about the rotation axis 30. Suitable roller bearings 45 may be used for this purpose as shown in FIGS. 2 and 3.

The rotation axis 30 of the roller head 9 extends perpendicularly to the rotation axis 32 of the cam carrier 33 shown in FIG. 1. The roller head 9 comprises on its side facing the component 21 to be moved a flat surface 23 which bears against a further flat counter surface 24. The counter surface 24 is formed on a member 25 which is arranged on the component 21 to be moved. The counter surface 24 may be formed directly on the component 21 thereby obviating the member 25. Due to the cooperation of the counter surface 24 with the flat surface 23 the roller head 9 is secured against rotation. Securing the roller head against rotation can alternatively be achieved by any other suitable construction. Thus, for example, two laterally arranged guide rods with guide bushings may be provided as a guide. A displacement of the roller head 9 in the adjustment direction 22, and thus, in the motion direction 37, however remains possible. For this purpose, the roller head 9 in the example embodiment of FIG. 2 is inserted with a shaft 1 into a respective bore 3 of an adjustment piece 16. The roller head 9 is rigidly secured to the shaft 1. The shaft comprises on its side facing away from the roller head 9, a centrally positioned inner threading 10 extending over the length 11. A head screw 12 is inserted into the inner threading 10. The head screw passes through a respective bore 14 in the adjustment piece 16. The shaft 1 has a cylindrical extension 38 having a smaller diameter on the free end of the shaft 1. Since the cylindrical extension 38 has a smaller diameter than the shaft 1, a hollow space is formed in the bore 3 in which a Belleville spring packet 39 is inserted. This Belleville spring packet 39 is so arranged that it applies a biasing force against the insertion motion of the shaft 1 which force increases as the insertion distance increases in response to the increased cam thickness D1 in the angular range 41 shown in FIG. 1. The spring characteristic of the Belleville spring packet 39 can be influenced by the arrangement of the spring elements in the Belleville spring packet 39. Hereby, the shaft 1 can be drawn into the bore 3 with the head screw 12 to such an extent that the Belleville spring packet 39 has the desired biasing. In order to subsequently provide the spring force required for the return stroke by a respective further inward displacement it is possible to move the shaft 1 by a respective thickening D1 of the cam track 40A maximally so far inwardly until the back side 46 of the roller head 9 contacts the respective facing side of the adjustment piece 16. In order to avoid redundant determinations, it is, however, necessary to avoid such contact. When relieving by a respective reduction in the thickness of the cam 40, the shaft 1 can move maximally so far out until the head of the head screw 12 comes to a stop. The basic adjustment should be such that even this end position of the head screw 12 is not reached because otherwise a safe contact of the circumference of the roller 26 on the cam surface 28 of the cam track 40A is not assured.

The adjustment piece 16 comprises on its outside an outer threading 19 engaging a respective threaded nut 20. In the example embodiment shown in FIGS. 2 and 3 the threaded nut 20 is constructed integrally with the component 21 to be moved. This integral construction, however, is by no means necessary. The adjustment piece 16 can be rotated in the female threading of the threaded nut 20 to thereby be moved in the adjustment direction 22. For this purpose, the adjustment piece 16 comprises at its free facing side a conventional outer hex head 47. For adjusting the cam track 40A, it is now possible to proceed, by a respective rotation of the cam carrier 33, in such a manner, that the rollers 26 and 27 are positioned in the limited angular range 41 of the upper dead point O.T. Prior to that, the head screw 12 was tightened to such an extent that the Belleville spring packet 39 exerts a biasing force that corresponds to the minimal force. In said upper dead point O.T. the adjustment piece 16 is now screwed in to such an extent that the circumferential surface of the roller 26 comes to bear on the cam surface 28 so that the shaft 1 now remains stationary. The adjustment piece 16 is now screwed further inwardly so that the force required for the return motion is established at the Belleville spring packet 39. Since the spring characteristic of the Belleville spring packet 39 is known, the presence of the required force can be ascertained by measuring the screw motion displacement. In a respective position the groove nut 17 is now tightened as a counter nut and locked by means of the lock washer 18. In this position, the apparatus is ready for operation. The occurring biasing spring forces are now controlled through the cross-sectional variations or thickness variations of the cam track 40A.

Figure 2:
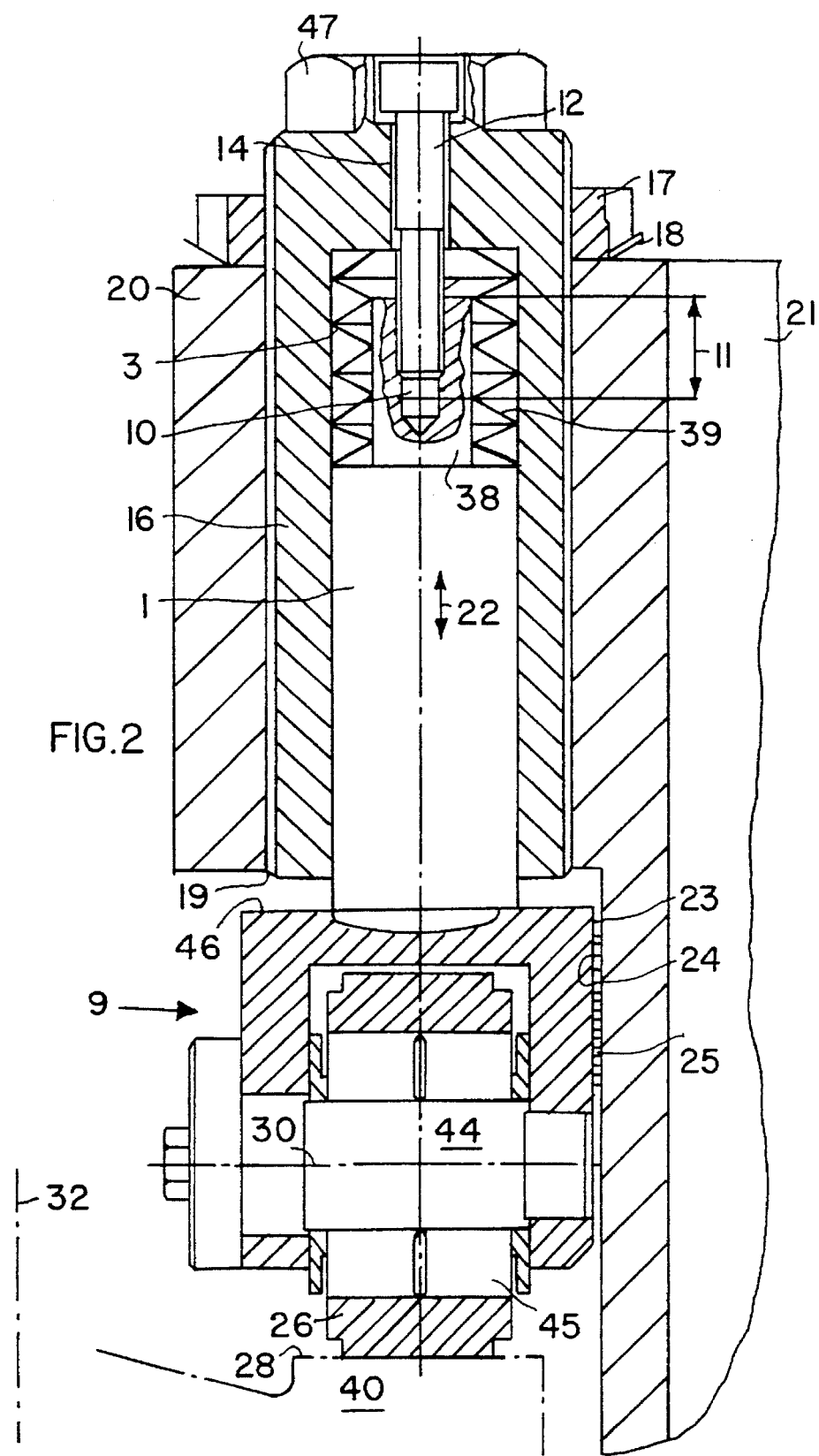
FIG. 2 shows a longitudinal section through an entraining element along section line II—II in FIG. 1, however with the cam follower roller shown at the bottom of the Figure rather than at the top.

A variant of the construction according to FIG. 2 with the controllable Belleville spring packet 39, is illustrated in FIG. 3 without a Belleville spring packet. The basic construction of FIG. 3 is comparable to that of FIG. 2. The spring biasing, however, is accomplished by a hydraulic spring HS and not by a mechanical spring such as the Belleville spring packet 39 of FIG. 2. Here again, the roller head 9 corresponds in its construction and in the formation of its locking against rotation, to the roller head 9 described with reference to FIG. 2. The shaft 2 of the roller head 9 according to FIG. 3 is, however, constructed as a hydraulic piston. The piston is inserted into the cylindrical bore 4 of the adjustment piece 15 which is substantially constructed as the adjustment piece 16 described above with reference to FIG. 2. The shaft 2 formed as a hydraulic piston, is sealed relative to the wall 5 by seals 49 and 50.

The shaft 2 also comprises an inner threading 10 in its side facing away from the roller head 9. The threading 10 extends over the length 11. As described above with reference to FIG. 2, a head screw 12 extends into the inner threading 10 through a respective bore 13 in the adjustment piece 15. However, the head screw 12 has a shaft portion without threading which is sealed by a seal 50 relative to the wall of the bore 13. The head screw 12 with its threaded portion may be screwed more or less into the shaft 2, whereby the maximal outward displacement length of the shaft is determined. The maximal inward displacement is limited by the back side 46 of the roller head 9. The back side 46 then bears against the respective facing side counter surface of the adjustment piece 15. In the outward moved condition, there is a gap in the bore 4 between the facing end of the bore 4 and the facing end of the shaft 2. Thus, the shaft 2 has the possibility of moving in the adjustment direction 22.

The free space in the bore 4 in front of the facing end of the shaft 2 facing away from the roller head 9 is completely filled with a hydraulic liquid. For this purpose, the respective head side of the adjustment piece 15 comprises a suitable connector bore 51 for a hydraulic conduit 6. The hydraulic conduit 6 in its turn comprises a nonreturn valve 7 which is arranged in front of a compression storage tank 8 that is refillable from the outside by a pressure source 53, whereby a return into the compression storage tank 8 out of the free cylinder space of the bore 4 is prevented. A filling of this free cylinder space of the bore 4 out of the compression storage tank 8 is, however, possible so that the hydraulic medium in said free cylinder space is always under a pressure produced by the compression storage tank 8 when the shaft 2 is not loaded, whereby the shaft 2 moves outwardly as far as is permitted by the head screw 12, whereby the shaft 2 is biased with a biasing force depending on the pressure in the compression storage tank 8. This biasing force must correspond in operation to the minimal force required for the return stroke. In this situation an adjustment is made by screwing the adjustment piece 15 so far inwardly until the circumferential surface of the roller 26 safely contacts the cam surface 28 of the cam 40 and the head screw 12 shows a tendency to lift off. In this position the head screw 12 may be screwed outwardly in order to provide still a small outward movement play and to avoid a redundant determination.

In the described arrangement, the hydraulic spring HS formed by the pressure source 53, the compression storage tank 8, the non-return valve 7, and the conduit 6 is hydraulically still very rigid, already very small thickness variations in the cam 40 cause very strong force changes. In order to provide the desired elasticity, it is possible to either install the conduit 6 with a respective large number of windings 52 or it is possible to connect with the conduit 6 a small compression storage tank not shown here in detail, but having a steep characteristic. This characteristic can be so selected that for a desired extent of an inward movement of the shaft 2, a respective force increase is caused by the rise of the hydraulic pressure in the small compression storage tank. From this in turn it is possible to ascertain the cross-sectional variation or thickness variation of the cam track 40A at the respective positions of the cam track 40A in order to produce the desired contact force, whereby it can be assured that the rollers 26 and 27 will always contact the respective surfaces 28, 29 of the cam track 40A and that at the respective points always the necessary forces can be taken up and so that simultaneously a relief of contact forces is obtained in the remaining cam areas. A further safety against an overloading is provided by connecting the conduit 6 with a pressure limiting valve 42 which opens at a preadjusted excess pressure to thereby provide for relief against locking.

It is seen from FIG. 1 that the rollers 26 and 27 are arranged one behind the other in the movement direction 37. The rollers 26 and 27 have rotational axes 30 and 31 which extend in parallel to each other and perpendicularly to the plane of the drawing sheet of FIG. 1 in which the rotational axis 32 of the cam carrier 33 extends. The cam track 40A passes between the circumferential surfaces, not provided with separate reference numbers, of the rollers 26 and 27. The cam track 40A is dimensioned already in the prior art in such a way that the cam surfaces 28 and 29 contact the circumferential surfaces of the rollers 26 and 27 at all times and along the entire cam track length, thereby never interrupting such contact. Also in the prior art as mentioned in the introductory portion of U.S. Pat. No. 5,050,426 (Wueller) large forces occurred naturally during the drive of a draw slide on a straight drawing machine during the drawing operation on the one hand and due to the high slide accelerations for a rapid return stroke of the slide on the other hand. These forces must be transmitted by the entraining members which already in the prior art normally comprise entraining rollers that bear against the cam surfaces 28, 29. The cam width and the spacing between cam curves must thereby be such that the rollers 26, 27 always bear on the respective cam surfaces 28, 29 because otherwise, unpermissably large impacts occur in the respective reversing points of the cam. These impacts occur due to a possibly present play of the component to be driven, for example, the draw slide so that the latter is no longer entrained until the respective cam surface 28, 29 again contacts the corresponding roller 26, 27. This reestablishing of the contact, however, causes an unwanted impact because the roller 26, 27 does not move with the corresponding velocity in the respective motion direction of the slide. In order to prevent such an impact, one could construct the rollers 26, 27 to be position adjustable so that both rollers 26, 27 contact the respective cam surfaces 28, 29. The roller adjustment could then be fixed in this contact position. However, as is known this approach would make it necessary to produce the respective width dimension of the cam track 40A at each point along the cam track 40A with an almost infinite precision because, for example, even a small excess dimension of the cam track width along any position of the cam track 40A would lead to the destruction of the bearings of the rollers.

In order to avoid this, it has been customary in the prior art to arrange one roller in a rigid position and the other roller on a spring biased tilting arm that causes the other roller to contact the corresponding cam surface. Thus, it is possible to compensate for dimensional inaccuracies of the cam track by the spring biased roller. Hereby, due to the occurring required drawing forces, the roller that causes the draw stroke of the draw slide is rigidly mounted on the draw slide, while the slide return stroke roller is mounted in the spring biasing fashion as described. However, since the return stroke also is introduced with a very high acceleration, the return stroke roller must also transmit large forces. The spring provided for the return stroke roller must thus also be correspondingly strong. This has the undesired consequence that the rollers are always pressed against the respective cam surfaces with correspondingly large forces, whereby an increased wear and tear was caused on the rollers 26, 27, on the respective roller bearings 45, and on the cam surfaces 28, 29. However, if a conventional spring, not shown, is adjusted to be too soft, unpermissible knocks and impacts still occur at the reversing points, because a conventional spring that has been adjusted to be too soft cannot withstand the occurring acceleration forces and thus the spring yields. This then leads to rapid destructions on the conventional machine. Such destructions are dreaded in practice as a result of which the mentioned conventional spring is preferably adjusted to be too hard. It also occurs that this conventional spring, due to the adjustment, is pressed together to form a single block so that no spring yielding whatsoever continues to exist. In such an instance, a rapid destruction of the apparatus also occurs due to the unavoidable dimensional tolerances of the cam track. The person skilled in this art has tried to solve these known problems that have been described in U.S. Pat. No. 5,040,426 (Wueller) in the manner as described therein. However, the known solution leads to the initially mentioned problems which are to be eliminated.

FIG. 1 shows that by performing the draw stroke 36, the roller 27 works and thus roller 27 must contact the cam surface 29. During the draw stroke 36, the roller 26 as such does not have to transmit any forces. However, during the return stroke which takes place in a direction opposite to that of the draw stroke 36, the required force transmission is performed by the roller 26. This roller 26, however, is movable against a spring bias, whereby this spring bias can be maintained to be very small and merely serves for the purpose that the roller 26 is maintained in contact with the respective cam surface 28 in those areas along the cam track 40A in which the roller 26 does not have to transfer any force. However, a larger force is necessary for the application of a brake action and for the acceleration in the reverse direction and also thereafter for the constant return stroke of the slide to be moved. Thus, the roller 26 would "spring-in" during the reversing of the slide motion in the direction of the return stroke and during the constant return stroke in order to establish the required spring force for the mentioned motions so that the roller 27 would lift off from the cam surface 29 in an undesirable manner. In order to prevent this, the cam 40 is thickened in the zone 41 compared to the other cam area so that the roller 26 "springs-in" due to the increasing cam cross-section, thereby establishing the spring force required for the following motions without making it possible for the opposite roller to lift off. Thus, still during the stroke in the draw direction and at the end of the constant stroke velocity of the draw slide, the cam cross-section is gradually increased in the zone 41 up to a maximum which, as a rule, occurs prior to the upper reversing point O.T. The cross-sectional increase is such that a spring force can be established which can generate the brake force and the following acceleration force for beginning the return stroke. The cam cross-section can again be diminished at the latest when the constant return stroke velocity has been reached. Such diminishing taking place in such a way that the spacing between the rollers 26 and 27 is again diminished due to the spring action on the roller 27, whereby the roller 26 again bears with a small force on the cam surface 28. If desired, the roller spacing between the rollers 26 and 27 may be further reduced in the area of the lower reversing point U.T. and for the duration of the draw stroke by a respective change in the cam cross-section in order to further reduce the spring force which causes the roller 26 to contact the cam surface 28 of the cam track 40A.

In the construction of FIG. 2, the spring characteristic of the Belleville spring packet is substantially determined by the dimensions of the Belleville spring packet 39 and by how the individual spring elements of the Belleville spring packet 39 are stacked. In the structural variation of FIG. 3, the characteristic of the hydraulic spring depends on the elasticity of the conduit 6 and, if applicable, on the windings 52 forming the conduit 6 or they depend on the characteristic of a pressure storage tank 8 shown in FIG. 3 and connectable to the system.

The cross-sectional variation of the cam track 40A must be dimensioned depending on the angle of inclination and on the curvature of the spring characteristic within one revolution of the cylinder or drum 40 in order to produce the respective spring force due to a respective spacing variation between the rollers 26 and 27. The basic function of such a cam drive is described in the above mentioned U.S. Pat. No. 5,040,426 (Wueller).

The teaching according to the invention succeeds in varying the forces of a mechanical spring shown in FIG. 2 or a hydraulical spring shown in FIG. 3 within the course of one revolution of the cylinder or drum 40 in such a way that an optimal relief of all structural components is achieved. The variation of the forces is achieved by a respective variation of the cross-section or the width of the corresponding cam track 40A which in turn causes a corresponding spacing change between the rollers 26, 27 contacting the cam track 40A, thereby causing a respective change in the forces in accordance with the corresponding spring characteristic. As a result, the rollers 26, 27 in contact with the cam track 40A can always be maintained in such contact with the cam track surfaces 28, 29 without the need to construct the shape of the cam track 40A and its dimensions with high precision. The conventional back tapered cam surface not shown herein is also no longer required. Complicated controls for varying said forces have been obviated.

Although the invention has been described with reference to specific example embodiments, it will be appreciated that it is intended to cover all modifications and equivalents within the scope of the appended claims.

We claim:

1. A method for controlling the contact force between a driving closed cam track (40A) and at least one cam follower roller of a pair of cam follower rollers (27 or 27) contacting said closed cam track (40A) on opposite track surfaces (28, 29), with a spring force for urging said at least one cam follower roller against a respective cam surface (28) of said closed cam track (40A) having a thickness (D) between said cam follower rollers (26, 27), wherein one full revolution of said closed cam track (40A) drives said cam follower rollers (26, 27) axially relative to a rotational axis of said closed cam track (40A) at least once back and forth between two reversing points (O.T.; U.T.), comprising the following steps:

(a) producing said spring force by a Belleville spring (39) having a spring characteristic which is responsive to a change in said thickness (D) of said closed cam track (40A) in a limited angular range (41) of said closed cam track, (b) increasing said spring force of said Belleville spring (39) by an increasing cam thickness (D1) in said limited angular range (41) next to and toward at least one reversing point (O. T.) of said two reversing points (O. T.; U. T.) to such an extent that an increased contact force corresponds at least to the inertia force of a component (21) to be moved back and forth by said cam follower rollers (26, 27) to maintain said cam follower rollers (26, 27) in contact with their respective cam surface (28, 29) within said limited angular range (41), (c) decreasing said spring force of said Belleville spring (39) by a decreasing cam thickness (D2) next to and away from said at least one reversing point (O. T.), in said limited angular range (41), down to a minimal contact force outside said limited angular range (41), said minimal contact force being sufficient to maintain said cam follower rollers (26, 27) in contact with said cam surfaces (28, 29) at all times outside said limited angular range (41) during said one full revolution of said closed cam track (40A), and (d) limiting said spring force of said Belleville spring (39) to an upper limit in said limited angular range (41).

2. The method of claim 1, wherein said limited angular range (41) is about 100° and wherein said at least one reversing point (O. T.) is positioned approximately centrally in said limited angular range (41).

3. The method of claim 1, wherein said contact force is controlled to reach its maximum within said limited angular range (41) just prior to said at least one reversing point (O. T.).

4. A method for controlling the contact force between a driving closed cam track (40A) and at least one cam follower roller of a pair of cam follower rollers (26 or 27) contacting said closed cam track (40A) on opposite track surfaces (28, 29), with a spring force for urging said at least one cam follower roller against a respective cam surface (28) of said closed cam track (40A) having a thickness (D) between said cam follower rollers (26, 27), wherein one full revolution of said closed cam track (40A) drives said cam follower rollers (26, 27) axially relative to a rotational axis of said closed cam track (40A) at least once back and forth between two reversing points (O.T.; U.T.), comprising the following steps:

(a) producing said spring force by a hydraulic spring (HS) having a spring characteristic which is responsive to a change in said thickness (D) of said closed cam track (40A) in a limited angular range (41) of said closed cam track, (b) increasing said spring force of said hydraulic spring (HS) by an increasing cam thickness (D1) in said limited angular range (41) next to and toward at least one reversing point (O. T.) of said two reversing points (O.T.; U.T.) to such an extent that an increased contact force corresponds at least to the inertia force of a component (21) to be moved back and forth by said cam follower rollers (26, 27) to maintain said cam follower rollers (26, 27) in contact with their respective cam surface (28, 29) within said limited angular range (41), (c) decreasing said spring force of said hydraulic spring (HS) by a decreasing cam thickness (D2) next to and away from said at least one reversing point (O.T.), in said limited angular range (41) down to a minimal contact force outside said limited angular range (41), said minimal contact force being sufficient to maintain said cam follower rollers in contact with said cam surfaces (28, 29) at all times outside of said limited angular range (41) during said one full revolution of said closed cam track (40A), and (d) limiting said spring force of said hydraulic spring (HS) to an upper limit value by a pressure relief valve (42).

5. The method of claim 4, wherein said limited angular range (41) is about 100° and wherein said at least one reversing point (O. T.) is positioned approximately centrally in said limited angular range (41).

6. The method of claim 4, wherein said contact force is controlled to reach its maximum within said limited angular range (41) just prior to said at least one reversing point (O. T.).

\* \* \* \* \*

UNITED STATES PATENT AND TRADEMARK OFFICE
CERTIFICATE OF CORRECTION

PATENT NO. : 5,603,245
DATED : Feb. 18, 1997
INVENTOR(S) : Bruno Walczak et al.

It is certified that errors appear in the above-identified patent and that said Letters Patent is hereby corrected as shown below.

Col. 1, line 12, after "closed" insert --or endless drive cam arranged on a rotating cam carrier for the--;
line 27, after "under" delete "U.S. Pat."

Col. 2, line 17, after "one" delete "by";

Col. 3, line 19, after "by a" delete ";";

Col. 5, line 10, after "respectively" delete ", after";
line 11, after "thickness D" insert --in the axial direction--;
line 17, after "controls" delete ";";

Col. 8, line 36, after "U.S. Pat. No." delete "5,050,426" and insert --5,040,426--.

Signed and Sealed this

Fourteenth Day of October, 1997

Attest:

BRUCE LEHMAN

Attesting Officer

Commissioner of Patents and Trademarks